United States Patent [19]

Lederle et al.

[11] 4,317,741

[45] Mar. 2, 1982

[54] USE OF POLY(OXYALKYLATED) HYDRAZINES AS CORROSION INHIBITORS

[75] Inventors: Henry F. Lederle, North Haven; Frank J. Milnes, Guilford, both of Conn.

[73] Assignee: Olin Corporation, New Haven, Conn.

[21] Appl. No.: 229,368

[22] Filed: Jan. 29, 1981

[51] Int. Cl.³ .......................... C09K 5/02; C10M 3/26
[52] U.S. Cl. ...................... 252/77; 252/392; 252/75; 564/310; 564/464
[58] Field of Search .............. 252/77, 75, 392, 394; 564/310, 313, 464

[56] References Cited

U.S. PATENT DOCUMENTS 3,264,231  8/1966  Ibbotson .............................. 260/2.5
3,377,288  4/1968  Sawyer .
3,629,111 12/1971  Cramer ................................. 252/75
3,770,055 11/1973  Larsen ............................. 166/244 C
3,928,219 12/1975  Papay et al ..................... 252/51.5 R

FOREIGN PATENT DOCUMENTS 987354  3/1965  United Kingdom .

Primary Examiner—P. E. Willis, Jr.
Attorney, Agent, or Firm—William A. Simons; Thomas P. O'Day

[57] ABSTRACT

Disclosed are selected poly(oxyalkylated) hydrazines of the formula:

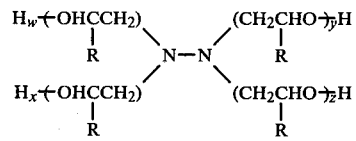

wherein R is selected from hydrogen, lower alkyl groups having from 1 to 4 carbon atoms, phenyl and mixtures thereof; and the sum of w, x, y, and z is from about 4 to about 20. These compounds are shown to be effective corrosion inhibitors for hydraulic fluids.

14 Claims, No Drawings

USE OF POLY(OXYALKYLATED) HYDRAZINES AS CORROSION INHIBITORS

BACKGROUND OF THE INVENTION

1. Field of the Invention

This invention relates to the use of selected poly(oxyalkylated) hydrazines as corrosion inhibitors in hydraulic fluids.

2. Brief Description of the Prior Art

Poly(oxyalkylated) hydrazines are known compounds. For example, British Pat. No. 987,354, which issued to Farbenfabriken Bayer A.G. on Mar. 24, 1965, teaches that alkylene oxide adducts of hydrazine [e.g., tetra(hydroxypropyl)hydrazine] may be used to prepare cellular polyurethane. However, the art is devoid of any teaching that these adducts may be used as corrosion inhibitors.

Separately, a wide variety of chemical compounds have been disclosed which effectively reduce the corrosive properties of liquids such as hydraulic fluids. These inhibitors are generally added to the corrosive liquids to protect the metals in contact with these liquids. Alternatively, such inhibitors may be applied first to the metal surface, either as is, or as a solution in some carrier liquid or paste.

While many of these corrosion inhibitors have been used successfully for many years, stricter toxicological and other environmental standards are restricting the use of some of the compounds (e.g., chromates and dichromates). Accordingly, there is a need in the art to develop new and effective corrosion inhibitors which do not pose these environmental problems.

BRIEF SUMMARY OF THE INVENTION

The present invention is directed to the use of poly(oxyalkylated) hydrazines of the formula (I):

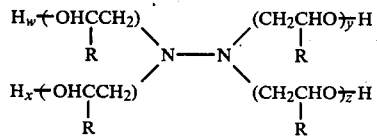

wherein each R is individually selected from hydrogen, lower alkyl groups and phenyl; and the sum of w, x, y, and z is from about 4 to about 20, as corrosion inhibitors, particularly in hydraulic fluids.

DETAILED DESCRIPTION

The poly(oxyalkylated) adducts of hydrazine may be made by reacting one mole of hydrazine, either in anhydrous form or in an aqueous solution (such as hydrazine hydrate containing 64% by weight of hydrazine), with about four or more moles of either ethylene oxide (EO), propylene oxide (PO), butylene oxide (BO), styrene oxide (SO), or the like, or mixtures thereof (either sequentially or mixed together). The general reaction for making these adducts is illustrated by the following Equation (A) wherein one mole of hydrazine is reacted with 12 moles of propylene oxide to produce the desired hydrazine.12 propylene oxide adduct product:

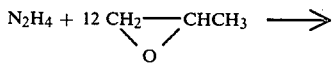

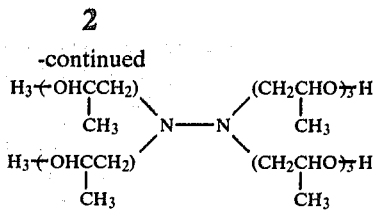

The oxide reactants of the present invention are commercially available chemicals which may be obtained from many sources. Mixtures of different oxides (e.g., EO and PO) may also be employed as reactants, either added sequentially or mixed together.

It should be understood that the number of moles of oxide reacted at each of the four reactive sites of the hydrazine molecule will not always be the same. For example, in Equation (A), above, (where 12 moles of PO were reacted), it does not necessarily follow that 3 moles of PO will react at each site. Instead, it may be in some instances that only 1 mole or may be none, will react at one site and 7, or more, moles may react at another site. Furthermore, it should be understood that the total number of alkylene oxide moles on each resulting adduct molecule will be statistically distributed. Thus, the sum of w, x, y, and z in Formula (I) represents the average number of alkylene oxide units per adduct and that the actual number of any given adduct may be less or greater than that sum. That is, when $w+x+y+z=12$, it is meant that 12 moles of an alkylene oxide like EO or PO have been reacted per mole of hydrazine.

Preferably, it is desired to employ from about 6 to 10 moles of alkylene oxide per mole mole of hydrazine. The preferred alkylene oxides are EO, PO, and mixtures thereof (either together or sequentially) because of cost considerations. Also preferably, all of these four reaction sites on the hydrazine molecule are reacted (i.e., each of w, x, y, and z are at least 1) in order to prevent undesirable side reactions. The covering of all four of the hydrazine reaction sites is better assured when at least about 6 moles of alkylene oxide are employed per mole of hydrazine.

Any conventional reaction conditions designed to produce these poly(oxyalkylated) hydrazine adducts may be employed in the synthesis of the present compounds and the present invention is not intended to be limited to any particular reaction conditions. Advantageously and preferably, the present compounds may be made according to the reaction illustrated by Equation (A) without either an inert solvent and/or a catalyst like potassium hydroxide or sodium methylate. However, the use of a solvent and/or a catalyst may be desirable when making some long-chain adducts. The reaction temperature and time will both depend upon many factors including the specific reactants and apparatus employed. In most situations, reaction temperatures from about 10° C. to about 120° C., preferably from about 60° C. to about 100° C. may be employed. Reaction times from about 30 minutes to about 24 hours may be employed. The reaction may preferably be carried out at atmospheric pressure or under pressure from about 10 to about 100 psig or more, if desired. The desired adduct product may be recovered from the reaction mixture by any conventional means, for example, by vacuum stripping. It should be noted that the use of aqueous solutions of hydrazine such as hydrazine hydrate is not detrimental to this adduct formation. Because hydrazine is very nucleophilic, the alkylene oxide will preferably react with it instead of the water reactions. Thus, formation of glycols is minimized.

It should be noted that while the reaction illustrated by Equation (A) is the preferred method for preparing the compounds of the present invention, other synthetic methods may also be employed.

Also, in accordance with the present invention, it has been found that the compounds of Formula (I), above, may be utilized as effective corrosion inhibitors. In practicing the process of the present invention, metal surfaces are contacted with an effective corrosion-inhibiting amount of one or more of these compounds. "Metal surfaces" which may be protected by the corrosion-inhibiting properties of the compounds of the present invention include ferrous and non-ferrous metals such as cast iron, steel, brass, copper, solder, aluminum, and other materials commonly used with corrosive liquids. It is understood that the term "effective corrosion-inhibiting amount" as used in the specification and claims herein is intended to include any amount that will prevent or control the corrosion on said metal surfaces. Of course, this amount may be constantly changing because of the possible variations in many parameters. Some of these parameters may include the specific corrosive material present; the specific compound used; the specific metal to be protected against corrosion; the salt and oxygen content in the system; the geometry and capacity of the system to be protected against corrosion; flow velocity of the corrosive material; temperature and the like.

One preferred use of the corrosion inhibitors of the present invention is in hydraulic fluids which are in contact with metal surfaces. Such hydraulic fluid compositions contemplated by the present invention include hydraulic brake fluids, hydraulic steering fluids, fluids used in hydraulic lifts and jacks. Also included in the scope of this invention are hydraulic fluids used in hydraulic systems such as employed in heavy equipment and transportation vehicles including highway and construction equipment, railways, planes and aquatic vehicles.

The hydraulic fluids of this invention, like those of the prior art, are generaly made up of three principal units, i.e., (1) a base or lubricant, (2) diluent and (3) an inhibitor portion containing one or more of the corrosion inhibitors of the present invention. In some instances, the base fluid and the diluent fluid may be the same.

The base or lubricant portion of the hydraulic fluid will generally consist of heavy bodied fluids such as polyglycols, castor oil, mixtures of these materials, etc. More particularly, the base or lubricant portion of the fluid may comprise one or more polyhydric alcohols or polyhydric alcohol ethers or mixtures thereof. Illustrative of polyhydric alcohols which can be used are polyoxyalkylene glycols such as polyoxyethylene glycols and polyoxypropylene glycols; mixed polyoxyalkylene glycols such as polyoxyethylene-polyoxypropylene glycols; polyoxyalkylene triols such as oxyalkylated glycerol; and polyoxyalkylene adducts of phenols. Illustrative of polyhydric alcohol ethers which can be used are the alkyl and aryl monoethers and diethers of the polyhydric alcohols described above, for example, polyoxyethylene glycol nonylphenyl ethers, polyoxypropylene glycol nonylphenyl ethers, polyoxypropylene glycol mono- or dialkyl ethers; mixed polyoxyethylene and polyoxypropylene mono- or dialkyl ethers and mixtures thereof.

The diluent portion of the hydraulic fluid of this invention may generally comprise an alcohol, glycol or glycol ether. More particularly, the diluent may comprise a mono or dihydric alcohol, a glycol monoether or diether and mixtures thereof. Illustrative of the diluents which may be used are the alkylene glycols of the formula (B):

$$HO(R'O)_pH \qquad (B)$$

where R' is alkylene of from 2 to 3 inclusive carbon atoms and p is an integer of from 1 to 3 inclusive. Useful glycols include ethylene glycol, propylene glycol, diethylene glycol, dipropylene glycol and triethylene glycol. Further illustrative of diluents which may be used are the glycol monoethers or diethers of the formula (C):

$$R''[O-(CH_2)_x]_yOR''' \qquad (C)$$

wherein R" is alkyl from 1 to 6 carbon atoms, R"' is hydrogen or alkyl of 1 to 6 carbon atoms, x is an integer of from 2 to 4 and y is a integer of from 1 to 4. Useful glycol ethers include, for example, ethylene glycol monomethyl ether, diethylene glycol monomethyl ether, triethylene glycol monomethyl ether, propylene glycol monomethyl ether, tripropylene glycol monomethyl ether, diethylene glycol monoethyl ether, diethylene glycol monobutyl ether, tetrapropylene glycol monobutyl ether, tributylene glycol mono-n-propyl ether, tetrabutylene glycol mono-n-butyl ether, and the like.

The above-described base or lubricant and diluents are merely exemplary and are not intended as an exclusive listing of the many well-known base or lubricant and diluent materials of this type which are used in the hydraulic fluid art. Other illustrations of these materials may be found in U.S. Pat. No. 3,377,288 and in "Introduction to Hydraulic Fluids" by Roger E. Hatton, Reinhold Publishing Corp., 1962.

The inhibitor portion of hydraulic fluids generally comprises an antioxidant and an alkaline buffer to maintain the pH value of the hydraulic fluid in the range of from about 7 to about 11.5, as well as corrosion inhibitors of the present invention. However, the presence of either the buffers or the antioxidants is not necessary to practice the present invention. The essence of the present invention resides only in the use of a corrosion inhibitor portion which comprises one or more of the compounds of Formula (I).

The alkaline buffers employed in the hydraulic fluids of this invention include any conventional buffers suitable with the present corrosion inhibitors. Useful alkaline buffers include alkali metal borates such as sodium borate and potassium tetraborate; alkali metal soaps of fatty acids such as potassium oleate, the potassm soap of rosin or tall oil fatty acids; alkylene glycol condensates with alkali metal borates such as the ethylene glycol condensate of potassium tetraborate; amines such as morpholine, phenyl morpholine, ethanolamine, diethanolamine, triethanolamine, methyl diethanolamine, di-(2-ethylhexyl)amine, di-N-butyl amine, monoamyl amine, diamyl amine, dioctyl amine, salicylal monoethanol amine, di-β-naphthyl-p-phenylene diamine, dicyclohexyl amine; and amine salts such as mono or dibutyl ammonium borates, and dibutyl amine phosphates. Boric acid can also be employed in combination with alkali metal borates.

Various antioxidants, well known in the hydraulic fluid art may be employed in the fluids of this invention to protect the fluid and primarily the diluents from oxidation degradation. Illustrative of the many antioxidants which may be used are the following: phenothiazine; phenothiazine carboxylic acid esters; N-alkyl or N-arylphenothiazines such as N-ethyl phenothiazine, N-phenylthiazine; polymerized trimethyl dihydroquinoline; amines such as phenyl-alphanaphthylamine, phenyl-beta-naphthylamine, N,N-dioctyl diphenylamine, N,N-di-β-naphthyl-p-phenylene diamine, p-isopropoxy diphenylamine, N,N-dibutyl-p-phenylene diamine, diphenyl-p-phenylene diamine, N,N'-bis(1,4-dimethyl-pentyl)-p-phenylene diamine, N,N'-diisopropyl-p-phenylene diamine, p-hydrodiphenylamine; hindered phenols such as dibutyl cresol, 2,6-dimethyl-p-cresol, butylated 2,2-di-(4-hydroxyphenyl) propane, n-butylated aminophenol; butylated hydroxy anisoles such as 2,6-dibutyl-p-hydroxy anisole; anthraquinone; dihydroxy anthraquinone; hydroquinone; 2,5-di-tertiarylbutyl hydroquinone; 2-tertiary butylhydroquinone; quinoline; p-hydroxydiphenylamine; phenyl benzoate; 2,6-dimethyl p-cresol; p-hydroxy anisole; nordihydroguararetic acid; pyrocatechol; styrenated phenol; polyalkyl polyphenols; sodium nitrite and 4,4'-isopropylidenediphenol.

Mixtures of the above-noted alkaline buffers and antioxidants may be used if desired. In addition, it is noted that the compounds listed above are not an exclusive listing but are merely exemplary of the many well-known alkaline buffer and antioxidants which may be utilized.

Generally, the hydraulic fluid of this invention may constitute widely varying proportions of the individual components making up the fluid. More particularly, the base or lubricant portion and the diluent portion taken together may comprise up to about 99.8% by weight of the fluid composition and preferably up to about 95% by weight. Individually, the base or lubricant portion may constitute from about 10% to about 60% by weight and preferably from about 20% to about 50% by weight and the diluent may comprise from about 40% to about 90% and preferably from about 50% to about 80% by weight of the fluid composition. However, as noted above, the base fluid and diluent may be the same in some instances.

The inhibitor portion of the hydraulic fluid, including the alkaline buffer, antioxidant and corrosion inhibitors of Formula (A) may generally comprise up to about 6% by weight of the hydraulic fluid composition. More particularly, this inhibitor portion may range from about 0.2% to about 4.0% by weight of the total weight of the fluid composition. Individually, the corrosion inhibitors of Formula (I) may constitute up to about 1.5% and preferably from about 0.01% to about 1.0% by weight of the total fluid composition. The alkaline buffer and antioxidant each may also consititute up to about 1.5% by weight, and preferably from about 0.01% to about 1.0%, by weight of the total hydraulic fluid composition.

Additionally, the fluid composition of this invention may contain a rubber swelling adjuster such as an alkyl benzene having from 10 to 15 carbon atoms in the alkyl group. Illustrative of such compounds are dodecyl benzene, tridecyl benzene and isoheptadecyl benzene. If a rubber swelling adjuster is used, it generally will constitute from about 0.1% to about 3.0% by weight of the total fluid composition.

Other well-known additives (e.g., antifoam agents), commonly utilized in hydraulic fluids for various purposes, may also be incorporated into the fluids of this invention. Several such additives useful in hydraulic fluids are disclosed in "Introduction to Hydraulic Fluids" by Roger E. Hatton, Reinhold Publishing Corporation, 1962.

The corrosion inhibitors of this invention, comprising compounds of Formula (I), while primarily used in hydraulic fluids may also be used in other functional fluids such as heat transfer fluids, coolants and antifreeze fluids.

Any suitable method may be used in preparing the hydraulic fluid composition of this invention. The components may be added together or one at a time in any desired sequence. It may be preferable to add solid antioxidants and alkaline buffer as a solution. All components are mixed until a single phase composition is obtained.

The corrosion inhibitors of this invention have particularly been shown to be soluble in polyether fluids of the following examples and in water, thus would not tend to separate from these organic fluids when water is present; and have a broad applicability of protecting many types of metal against corrosion.

The following Examples are provided to further illustrate the present invention. All parts and proportions, unless otherwise explicitly indicated, are by weight.

EXAMPLE 1

A one-liter, three neck flask was fitted with a magnetic stirrer, thermometer, condenser with a dry ice condenser in tandem, nitrogen inlet and a pressure equalized dropping funnel. The apparatus was swept with nitrogen and then charged with hydrazine hydrate [100 g (2 moles) (64% aqueous solution of $N_2H_4$)]. While stirring and cooling, the addition of propylene oxide was begun [464 g (8 moles)]. The addition rate was 1-2 drops per second and the reaction temperature was maintained at 30° C.±10° by use of an ice bath and by adjusting the dropping rate. After adding ⅔ of the propylene oxide, the ice bath was removed and the remainder added slowly while heating the reaction flask to 90° C.±10°. After the addition was complete, the reaction mixture was heated 2½ hours at 90° C. After cooling under nitrogen, the product was stripped at 80°–90° C. under 1–2 mm vacuum to remove water. The elemental analysis of this adduct was as follows:

|  | C | H | N |
|---|---|---|---|
| Calculated for $N_2H_4 \cdot 4C_3H_6O$: | 54.54 | 10.61 | 10.61 |
| Found: | 52.70 | 9.98 | 10.50 |

EXAMPLE 2

Hydrazine hydrate [50 g (1 mole) (64% by weight aqueous solution of $N_2H_4$)] was charged to a $N_2$ flushed flask used in Example 1 and propylene oxide [172 g (3 moles)] was added over an eight hour period, maintaining the temperature below 43° C. with an ice bath. Additional propylene oxide [290 g (5 moles)] was slowly added over 16 hours while heating between 85° and 100° C. to give a viscous, water clear liquid. The product was cooled to room temperature and placed under 0.3 torr vacuum and heated to about 60° C. Considerable amount of volatiles came over. Obtained was 396 g of product which corresponds to the addition of six moles of propylene oxide. The elemental analysis for this adduct was as follows:

|  | C | H | N |
|---|---|---|---|
| Calculated for $N_2H_4 \cdot 6C_3H_6O$: | 56.84 | 10.53 | 7.37 |
| Found: | 54.88 | 9.62 | 6.92 |

EXAMPLE 3

In a manner similar to that described in Example 1, propylene oxide [600 g (10.3 moles)] was added to hydrazine hydrate [25 g (0.5 mole)]. Obtained was 517 g of product, corresponding to the addition of 17 moles of propylene oxide per mole of hydrazine. The elemental analysis for this adduct was as follows:

|  | C | H | N |
|---|---|---|---|
| Calculated for $N_2H_4 \cdot 17C_3H_6O$: | 60.12 | 10.10 | 2.75 |
| Found: | 59.05 | 10.24 | 2.66 |

EXAMPLE 4

Using the procedure described in Example 1, hydrazine hydrate [25 ml (0.5 mole)] was reacted with styrene oxide [240 g (2 moles)]. The initial reaction was exothermic, requiring cooling. After the addition of about 130 ml of styrene oxide, the mixture required heating to 65°–75° C. during the addition of the remaining 95 ml. The mixture was post-reacted one hour at 60° C. and then stripped at 50° C./3 torr to give 244 g of yellow product which on cooling gave a glass. The elemental analysis of this adduct was as follows:

|  | C | H | N |
|---|---|---|---|
| Calculated for $N_2H_4 \cdot 4C_8H_8O$: | 75.00 | 7.03 | 5.47 |
| Found: | 72.38 | 7.20 | 6.70 |

EXAMPLE 5

Using the procedure in Example 1, hydrazine hydrate [25 g (0.5 mole) (64% by weight aqueous solution of $N_2H_4$)] was reacted with butylene oxide [144 g (2 moles)]. Cooling was required to maintain 30°–40° C. during the addition of the first ¾ of the butylene oxide. The mixture was heated to 60°–70° C. and 0.5 g KOH added. The remainder of the butylene oxide was added and the mixture post reacted 3.5 hours at 80°–90° C. Three ml of acetic acid was added and the resulting solids filtered off. Vacuum stripping left 149.1 g of a yellow liquid. The elemental analysis of this adduct was as follows:

|  | C | H | N |
|---|---|---|---|
| Calculated for $N_2H_4 \cdot 4C_4H_8O$: | 60.00 | 11.25 | 8.75 |
| Found: | 55.16 | 10.32 | 8.76 |

EXAMPLE 6

Using the procedure in Example 1, hydrazine hydrate [25 g (0.5 mole)] was reacted with ethylene oxide [132 g (3 moles)]. Ethylene oxide requires the use of a dry-ice condenser. About half the ethylene oxide was added while cooling the reaction. The reaction mixture was heated to 70°–90° C. and KOH (1 g) added to complete the reaction. Three ml of acetic acid was added and the resulting solids filtered off. Vacuum stripping at 85°–90° C. left 152 g of a light orange liquid. The elemental analysis for this adduct was as follows:

|  | C | H | N |
|---|---|---|---|
| Calculated for $N_2H_4 \cdot 6C_2H_4O$: | 48.65 | 9.46 | 9.46 |
| Found: | 47.65 | 8.55 | 7.79 |

EXAMPLE 7

The compound prepared in Examples 1 and 2, above, were tested as corrosion inhibitor in a polyglycol-based hydraulic fluid according to the test method set forth in SAE-J1703F. This polyglycol-based fluid with the inhibitor had the following formula:

76.1% Triethyleneglycol monomethylether[1]
20.0% Polypropyleneglycol (molecular weight 1000)[2]
3.0% Polyethylene glycol (molecular weight 300)[3]
0.2% Borax[4]
0.2% Boric Acid
0.5% Compound of Example 1 or 2

[1]Poly-Solv ® TM—a diluent manufactured by the Olin Corp. of Stamford, Connecticut.
[2]Poly-G ® 20-112—a lubricant also manufactured by Olin Corp.
[3]Poly-G ® 300—also a lubricant manufactured by Olin Corp.
[4]Borax is $Na_2B_4O_7 \cdot 10H_2O$ After this fluid formulation is made, a bundle of six different metal coupons (previously weighed) was placed in a test jar containing 380 milliliters of this fluid and 20 milliliters of water. All of the coupons were completely covered by the solution. After running the test at 100° C. for 5 days, the coupons were removed, washed, dried and re-weighed. The weight change per square centimeter was then determined for each coupon. The results of this corrosion test in the fluid containing the compounds of Example 1 and of Example 2 are given in Table 1. As can be seen, the fluids containing the inhibitors had a smaller weight change for some metals than did a fluid containing only the borate buffer alone and, thus, offered protection against corrosion. No antioxidant was used in this hydraulic fluid.

TABLE 1

| SPECIMEN WEIGHT CHANGE MG/SQCM | | | | | | |
|---|---|---|---|---|---|---|
|  | Copper | Brass | Cast Iron | Alum. | Steel | Tinned Iron |
| Max Permissible (SAE J1703F) | 0.4 | 0.4 | 0.2 | 0.1 | 0.2 | 0.2 |
| Borate Buffer | 0.67 | 0.69 | 0.11 | 0.01 | 0.35 | 0.01 |
| $N_2H_4 \cdot 4PO$ | 0.03 | 0.03 | 0.15 | 0.05 | 0.04 | 0.05 |
| $N_2H_4 \cdot 6PO$ | 0.03 | 0.01 | 0.08 | 0.02 | 0.03 | 0.03 |

EXAMPLE 8

The compounds prepared in Examples 1, 2, 4, 5 and 6 were tested as corrosion inhibitors in a polyglycol-based fluid according to the test method set forth in SAE-J1703F. The fluid compositions were identical to that used in Example 7, with 0.5% of each fluid being a different inhibitor compound.

After these fluid formulations were made, a bundle of six different metal coupons (previously weighed) was placed in each test jar containing 380 milliliters of the fluid, 20 milliliters of water and enough sodium chloride to give a final chloride concentration of 100 ppm. All of the coupons were completely covered by the solution. After running the test at 100° C. for 5 days, the coupons were removed, washed, dried, and re-weighed. The weight change per square centimeter was then determined for each coupon. The results of this corrosion test in the fluid containing the compounds of Examples 1, 2, 4, 5 and 6 are given in Table II.

As can be seen, the metal coupons in the fluids containing the inhibitors had a smaller weight change than the maximum permissible value of the test procedure of SAE-J1703F.

TABLE II

| | SPECIMEN WEIGHT CHANGE MG/SQCM | | | | | |
|---|---|---|---|---|---|---|
| | Copper | Brass | Cast Iron | Alum. | Steel | Tinned Iron |
| Max Permissible (SAE J1703F) | 0.4 | 0.4 | 0.2 | 0.1 | 0.2 | 0.2 |
| N2H4 . 4PO | 0.01 | 0.01 | 0.02 | 0.01* | 0.02 | 0.00 |
| N2H4 . 6PO | 0.01 | 0.01 | 0.02 | 0.04* | 0.01 | 0.02 |
| N2H4 . 6EO | 0.02 | 0.03 | 0.10 | 0.11** | 0.04 | 0.05 |
| N2H4 . 4BO | 0.04 | 0.03 | 0.05 | 0.05* | 0.04 | 0.05 |
| N2H4 . 4SO | 0.04 | 0.01 | 0.09 | 0.07* | 0.04 | 0.06 |

*Very Slight Pitting
**Moderate Pitting

EXAMPLE 9

The compounds prepared in Examples 1, 2 and 3 were tested as corrosion inhibitors in a polyglycol-based hydraulic fluid according to the test method set forth in SAE-J1703F. This polyglycol-based fluid with the inhibitor had the following formula:

75.8% Triethyleneglycol monomethylether[1]
20.0% Polypropyleneglycol (molecular weight 1000)[2]
3.0% Polyethyleneglycol (molecular weight 300)[3]
0.2% Borax[4]
0.2% Boric Acid
0.4% Compound of Example 1, 2, or 3
0.2% Trimethylolpropane[5]
0.2% Bis Phenol A[6]

[1]Poly-Solv ® TM manufactured by the Olin Corp. of Stamford, Connecticut.
[2]Poly-G ® 20-112 also manufactured by Olin Corp.
[3]Poly-G ® 300 also manufactured by Olin Corp.
[4]Borax is Na2B4O7.10H2O.
[5]Trimethylolpropane is a solubilizer for Borax.
[6]Bis Phenol A is an antioxidant having the formula 4,4'-isopropylidenediphenol.

After this fluid formulation is made, a bundle of six different metal coupons (previously weighed) was placed in a test jar containing 380 milliliters of this fluid and 20 milliliters of water. All of the coupons were completely covered by the solution. After running the test at 100° C. for 5 days, the coupons were removed, washed, dried and re-weighed. The weight change per square centimeter was then determined for each coupon. The results of this corrosion test in the fluid containing the compounds of Examples 1, 2 and 3 are given in Table III.

TABLE III

| | SPECIMEN WEIGHT CHANGE MG/SQCM | | | | | |
|---|---|---|---|---|---|---|
| Compound | Copper | Brass | Cast Iron | Alum | Steel | Tinned Iron |
| N2H4 . 4PO | −0.02 | −0.04 | +0.04 | −0.01 | −0.02 | −0.02 |
| N2H4 . 6PO | 0.00 | −0.02 | +0.07 | +0.01 | −0.01 | 0.00 |

TABLE III-continued

| | SPECIMEN WEIGHT CHANGE MG/SQCM | | | | | |
|---|---|---|---|---|---|---|
| Compound | Copper | Brass | Cast Iron | Alum | Steel | Tinned Iron |
| N2H4 . 17PO | +0.03 | +0.01 | +0.09 | +0.05 | +0.05 | +0.06 |

What is claimed is:

1. In a hydraulic fluid composition comprising at least one base fluid, at least one diluent fluid and an inhibitor portion;
   the improvement which comprises:
       said inhibitor portion comprising an effective corrosion-inhibiting amount of a poly(oxyalkylated) hydrazine having the formula:

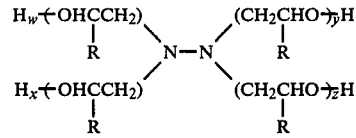

wherein each R is individually selected from hydrogen, lower alkyl groups having from 1 to 4 carbon atoms and phenyl; and the sum of w, x, y, and z is from about 4 to about 20.

2. The hydraulic fluid composition of claim 1 wherein the sum of w, x, y, and z is from about 6 to about 10.

3. The hydraulic fluid composition of claim 1 wherein R is always hydrogen.

4. The hydraulic fluid composition of claim 1 wherein R is always a methyl group.

5. The hydraulic fluid composition of claim 1 wherein the sum of w, x, y and z is from about 6 to about 10 and R is always a methyl group.

6. The hydraulic fluid composition of claim 1 wherein each of w, x, y, and z is at least 1.

7. The hydraulic fluid composition of claim 6 wherein the sum of w, x, y, and z is at least about 6.

8. The process for inhibiting corrosion of metal surfaces caused by corrosive hydraulic fluids, which comprises
   contacting said metal with an effective corrosion-inhibiting amount of a poly(oxyalkylated) hydrazine having a formula:

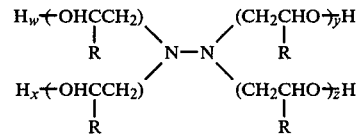

wherein each R is individually selected from hydrogen, lower alkyl groups having from 1 to 4 carbon atoms and phenyl; and the sum of w, x, y, and z is from about 4 to about 20.

9. The process of claim 8 wherein the sum of w, x, y, and z is from about 6 to about 10.

10. The process of claim 8 wherein R is always hydrogen.

11. The process of claim 8 wherein R is always a methyl group.

12. The process of claim 8 wherein the sum of w, x, y, and z is from about 6 to about 10 and R is always a methyl group.

13. The process of claim 8 wherein each of w, x, y, and z is at least 1.

14. The process of claim 13 wherein the sum of w, x, y, and z is at least about 6.

* * * * *